(12) United States Patent
Lee et al.

(10) Patent No.: US 12,308,967 B2
(45) Date of Patent: *May 20, 2025

(54) DYNAMIC CONFIGURATION OF MAXIMUM NUMBER OF SIDELINK RETRANSMISSIONS FOR DATA UNIT

(71) Applicant: LG Electronics Inc., Seoul (KR)

(72) Inventors: Youngdae Lee, Seoul (KR); Sunyoung Lee, Seoul (KR); Heejeong Cho, Seoul (KR); Eunjong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,641

(22) Filed: May 28, 2024

(65) Prior Publication Data

US 2024/0313893 A1 Sep. 19, 2024

Related U.S. Application Data

(63) Continuation of application No. 17/418,071, filed as application No. PCT/KR2020/001437 on Jan. 30, 2020, now Pat. No. 12,034,541.

(30) Foreign Application Priority Data

Jan. 30, 2019 (KR) ........................ 10-2019-0012281

(51) Int. Cl.
*H04L 1/18* (2023.01)
*H04W 28/06* (2009.01)
*H04W 72/23* (2023.01)
*H04W 92/18* (2009.01)

(52) U.S. Cl.
CPC ............. *H04L 1/18* (2013.01); *H04W 28/065* (2013.01); *H04W 72/23* (2023.01); *H04W 92/18* (2013.01)

(58) Field of Classification Search
CPC ......... H04L 1/18; H04L 1/1883; H04L 1/189; H04L 1/1864; H04W 28/065; H04W 72/23; H04W 92/18
See application file for complete search history.

(56) References Cited

U.S. PATENT DOCUMENTS

2017/0295559 A1* 10/2017 Agiwal ................ H04W 72/23
2020/0229198 A1* 7/2020 Kung .................... H04W 72/54
2021/0153065 A1* 5/2021 Adjakple .......... H04W 28/0268

* cited by examiner

*Primary Examiner* — Faruk Hamza
*Assistant Examiner* — Aixa A Guadalupe Cruz
(74) *Attorney, Agent, or Firm* — Fish & Richardson P.C.

(57) ABSTRACT

A method and apparatus for dynamic configuration of a maximum number of sidelink retransmissions for a data unit in a wireless communication system is provided. A first wireless device in sidelink receives, from a network, information related to a first retransmission number for a first logical channel and a second retransmission number for a second logical channel. The first wireless device determines a retransmission number of a data unit among the first retransmission number and the second retransmission number, and performs sidelink transmission of the data unit to a second wireless device based on the retransmission number of the data unit.

8 Claims, 14 Drawing Sheets

DYNAMIC CONFIGURATION OF MAXIMUM NUMBER OF SIDELINK RETRANSMISSIONS FOR DATA UNIT

CROSS-REFERENCE TO RELATED APPLICATIONS

This application is a continuation of U.S. application Ser. No. 17/418,071, filed on Jun. 24, 2021, which is a National Stage application under 35 U.S.C. § 371 of International Application No. PCT/KR2020/001437, filed on Jan. 30, 2020, which claims the benefit of Korean Patent Application No. 10-2019-0012281, filed on Jan. 30, 2019. The disclosures of the prior applications are incorporated by reference in their entirety.

TECHNICAL FIELD

The present disclosure relates to dynamic configuration of a maximum number of sidelink retransmissions for a data unit and sidelink resource allocation.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

SUMMARY

For V2X sidelink transmission, multiple packets from multiple logical channels for different services can be multiplexed into one single data unit. In this case, each of multiple packets from multiple logical channels for different services may have different requirements. Therefore, retransmission number for each of multiple packets from multiple logical channels for different services may need to be configured differently.

In an aspect, a method for a first wireless device in a wireless communication system is provided. The method includes receiving, from a network, information related to a first retransmission number for a first logical channel and a second retransmission number for a second logical channel, determining a retransmission number of a data unit among the first retransmission number and the second retransmission number, and performing, to a second wireless device, transmission of the data unit based on the retransmission number of the data unit.

In another aspect, an apparatus for implementing the above method is provided.

The present disclosure can have various advantageous effects.

A wireless device performing sidelink HARQ transmission of a packet by using radio resources can dynamically and efficiently allocate resources for retransmissions of the packet by considering service characteristics and/or requirements, in particular when packets from various services are multiplexed into a single data unit.

The system can provide dynamic and efficient allocation of resources for data retransmissions for a wireless device performing sidelink HARQ transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
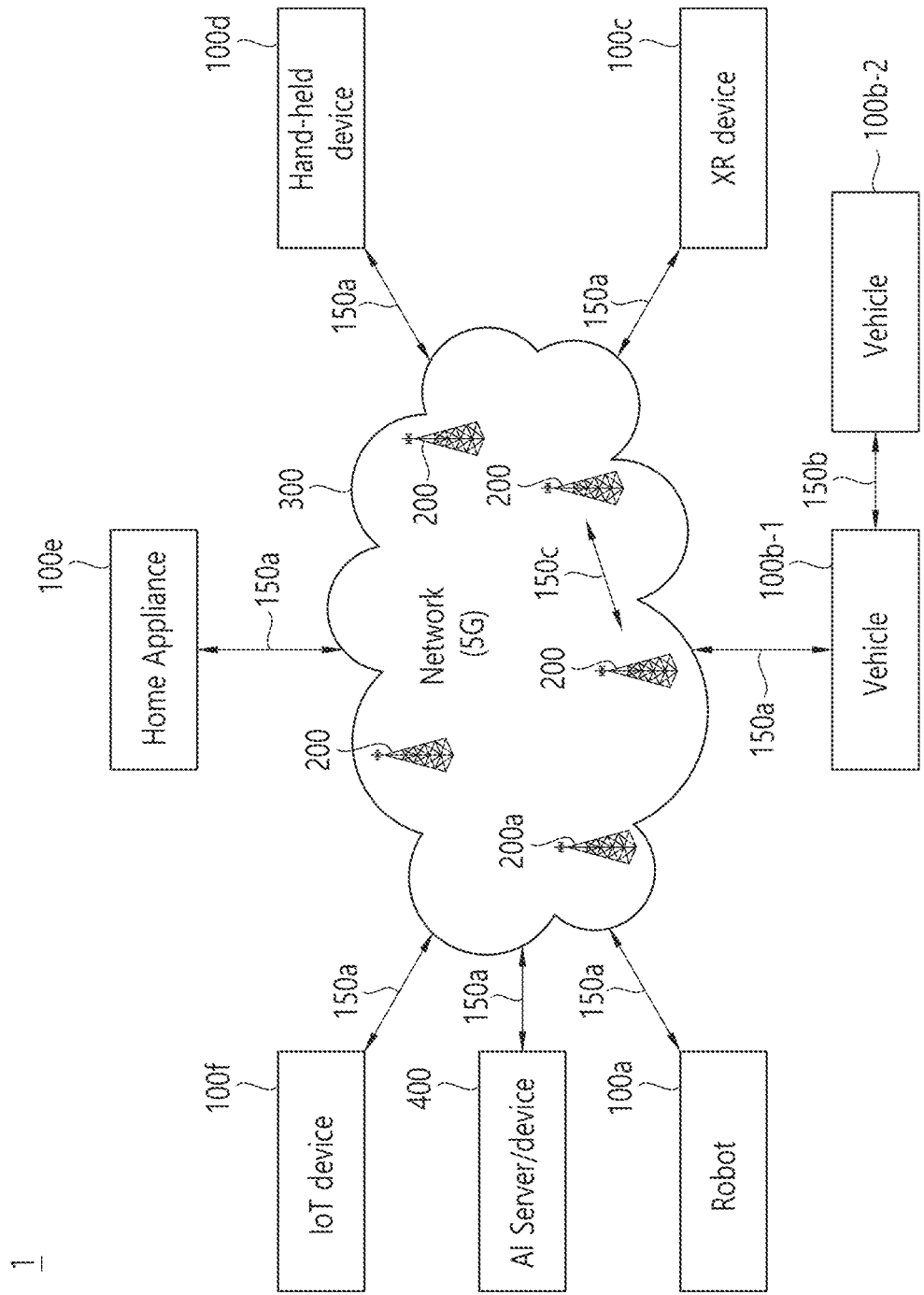
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (cMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device May be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g. vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
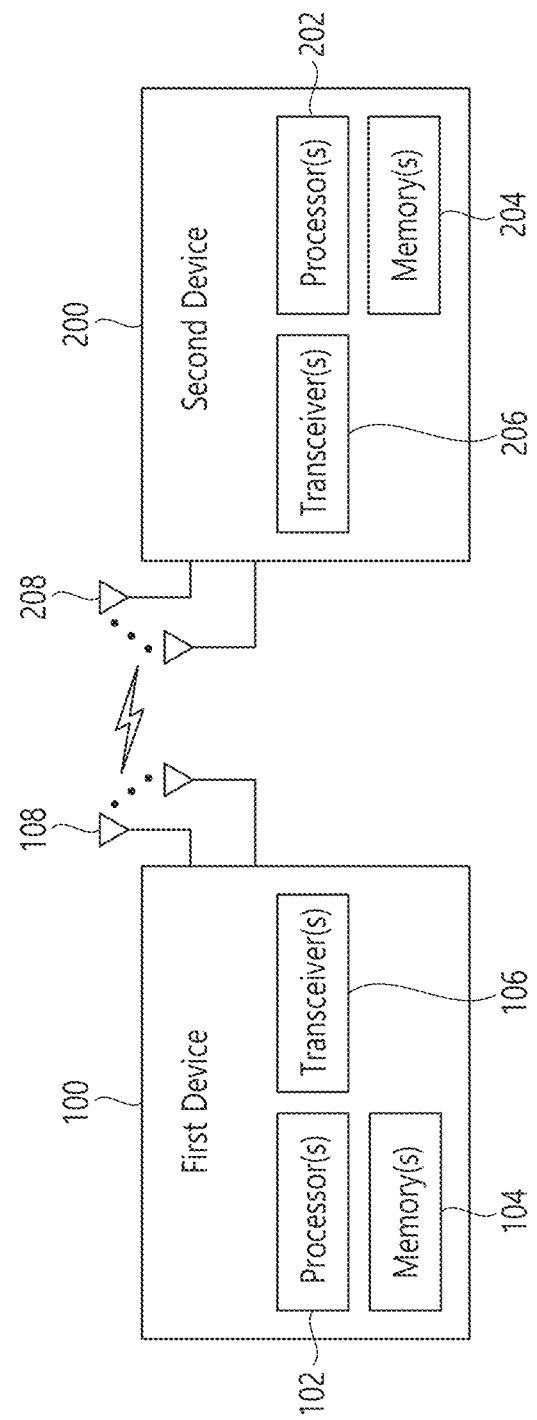
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
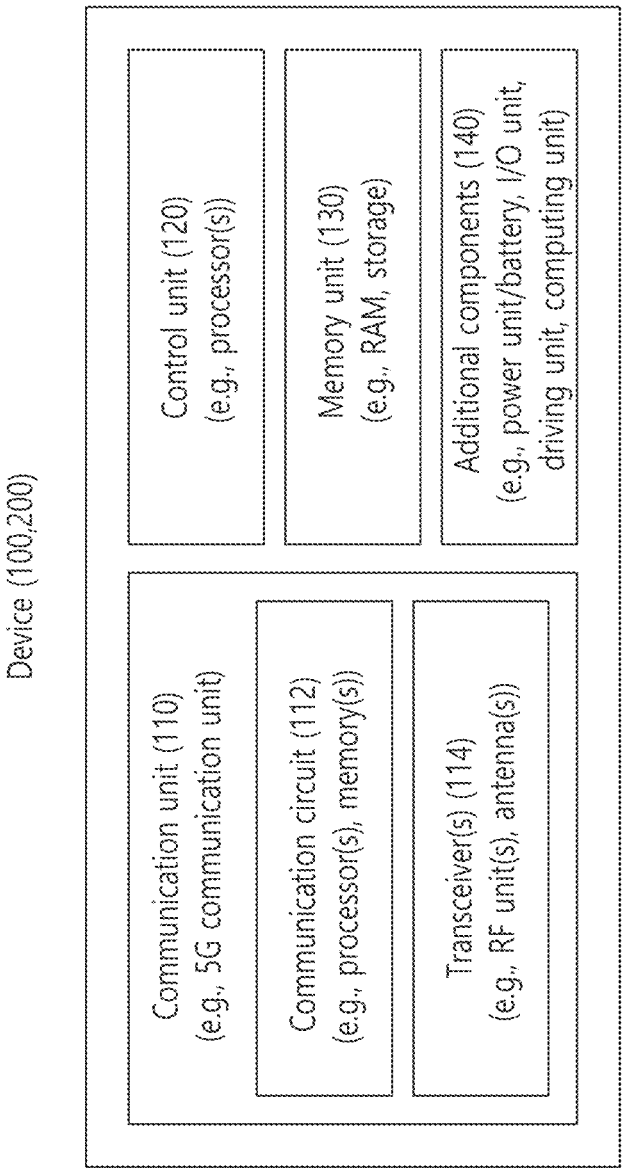
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
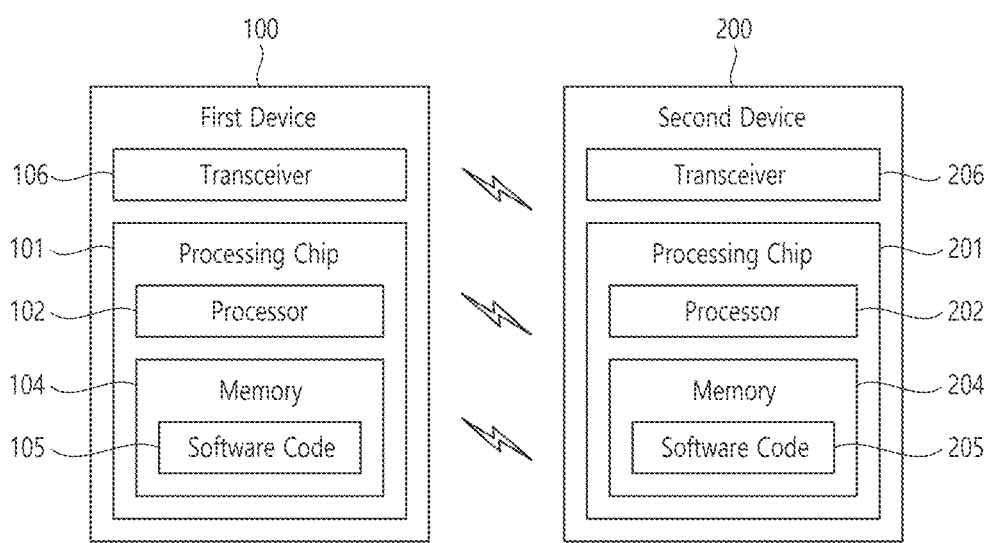
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
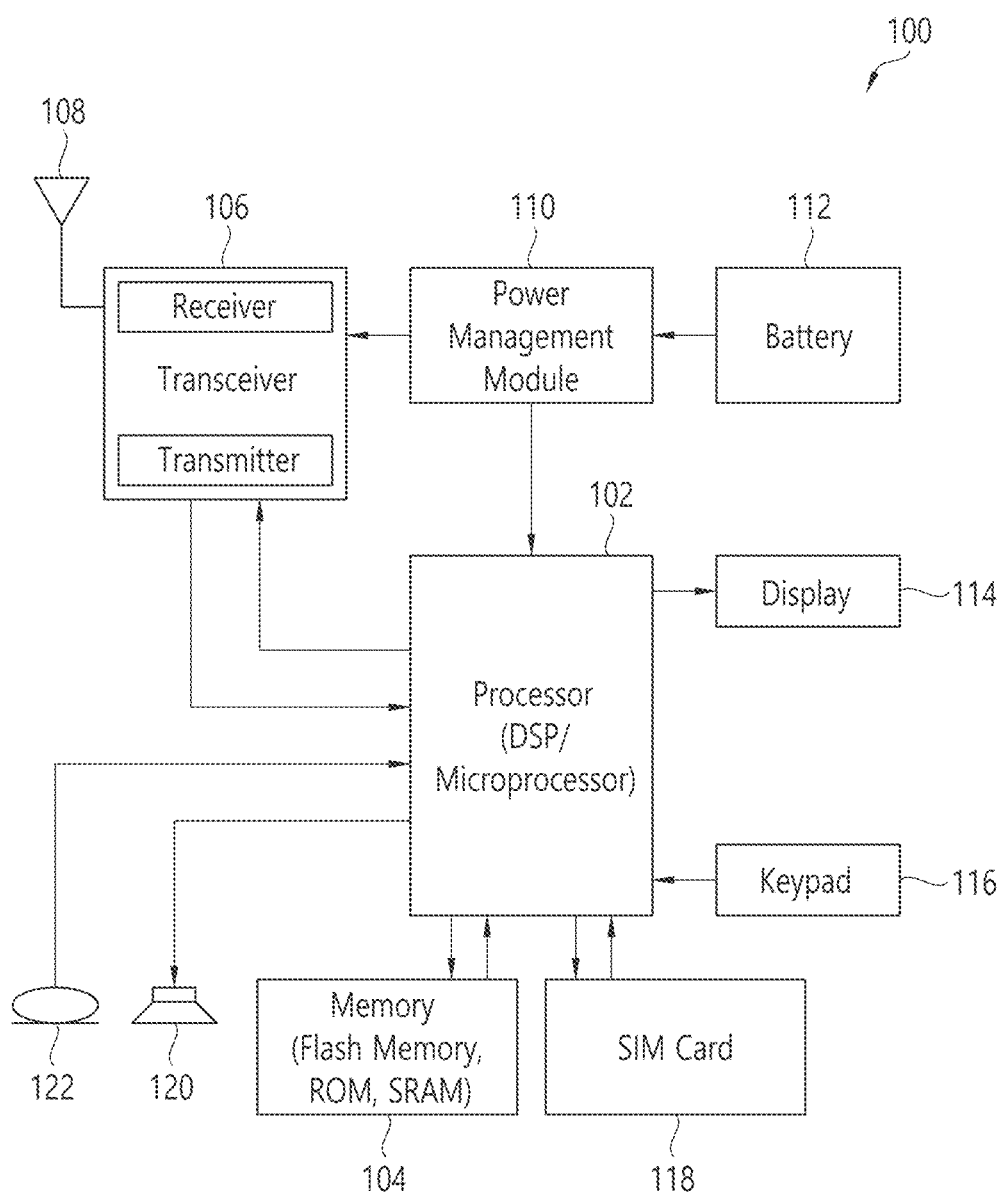
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
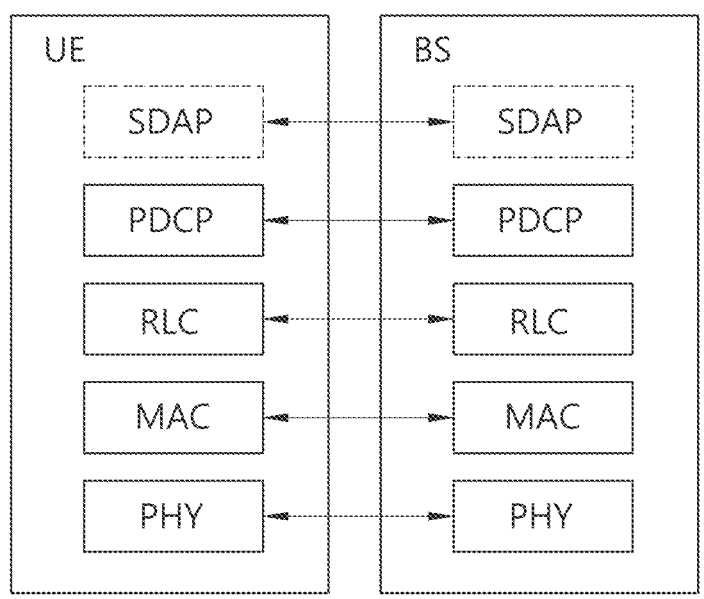
FIGS. 6 and 7 show an example of protocol stacks in a 3GPP based wireless communication system to which implementations of the present disclosure is applied.
Figure 7:
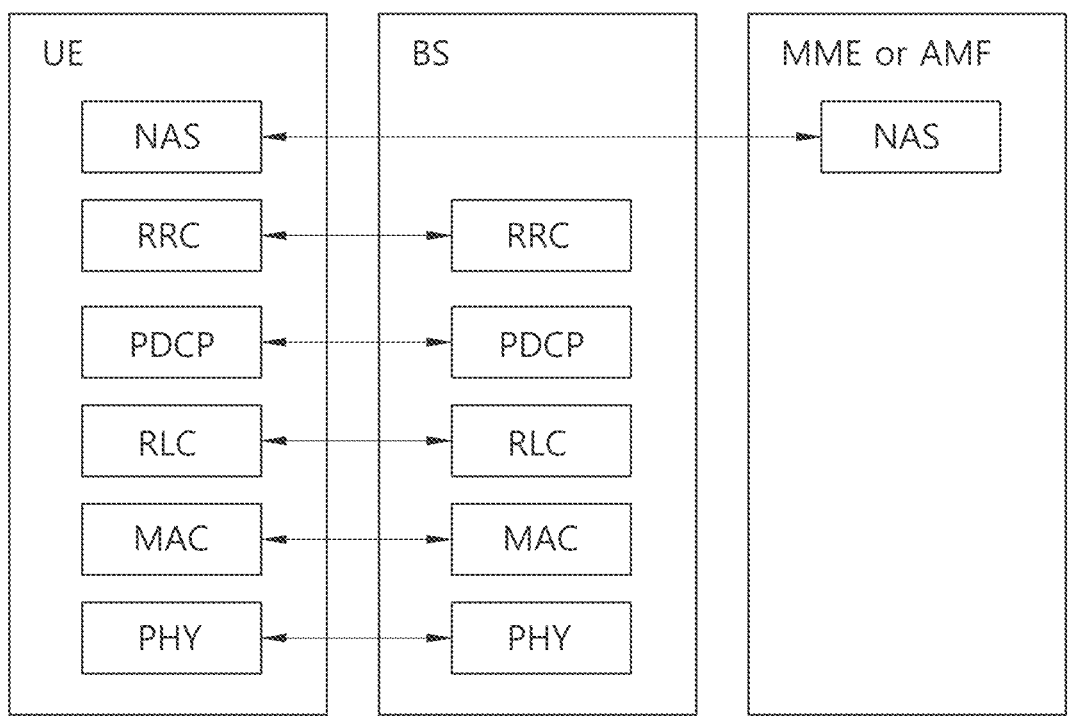

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QOS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
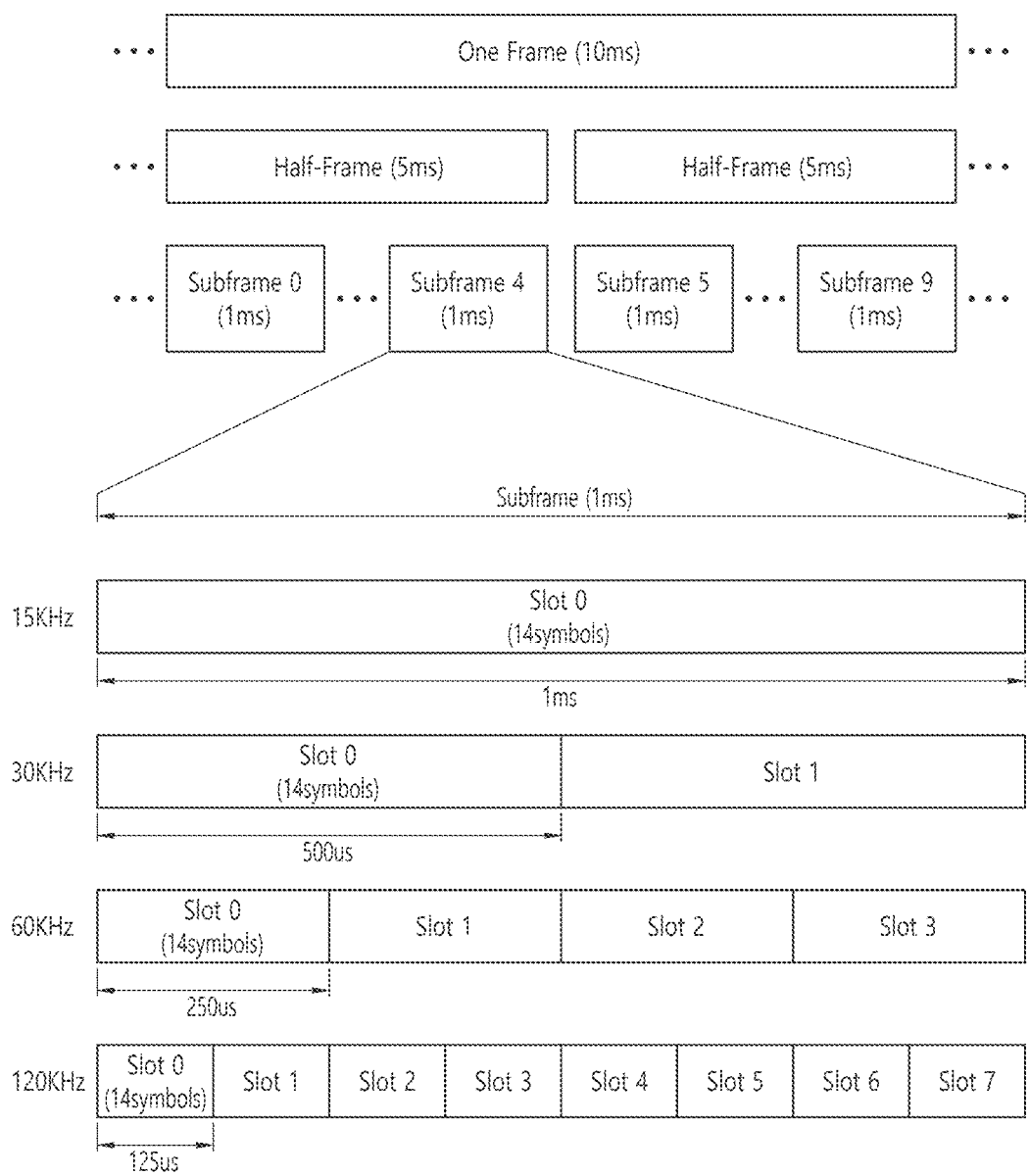
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\beta f=2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u * 15$ kHz.

TABLE 1

| u | $N^{slot}_{symb}$ | $N^{frame,\,u}_{slot}$ | $N^{subframe,\,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u * 15$ kHz.

TABLE 2

| u | $N^{slot}_{symb}$ | $N^{frame,\,u}_{slot}$ | $N^{subframe,\,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
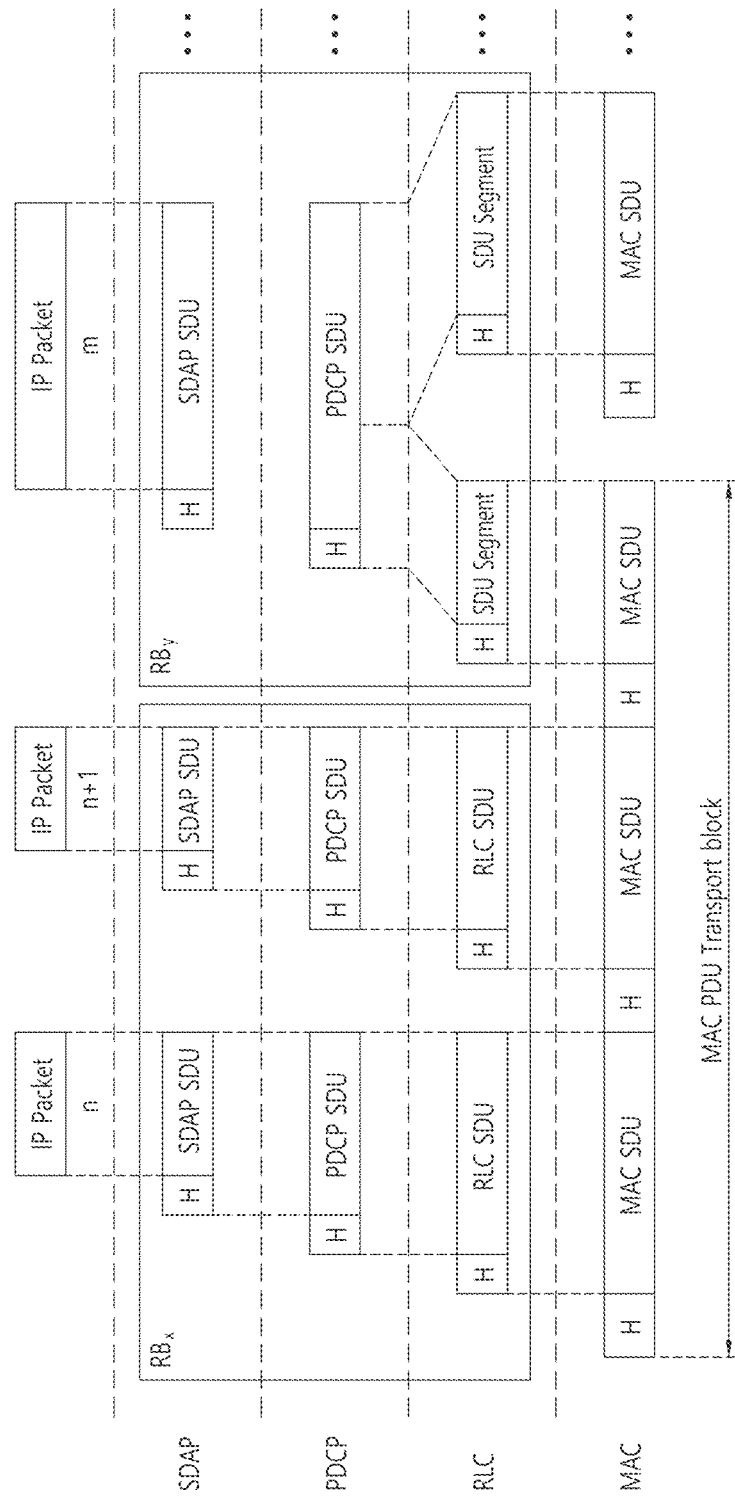
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Support for vehicle-to-vehicle (V2V) and vehicle-to-everything (V2X) services has been introduced in LTE during Releases 14 and 15, in order to expand the 3GPP platform to the automotive industry. These work items defined an LTE sidelink suitable for vehicular applications, and complementary enhancements to the cellular infrastructure.

Further to this work, requirements for support of enhanced V2X use cases have been defined in 5G LTE/NR, which are broadly arranged into four use case groups:

1) Vehicles platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.
2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.
3) Advanced driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.
4) Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

NR sidelink (SL) unicast, groupcast, and broadcast design is described. SL broadcast, groupcast, and unicast transmissions are supported for the in-coverage, out-of-coverage and partial-coverage scenarios.

Figure 10:
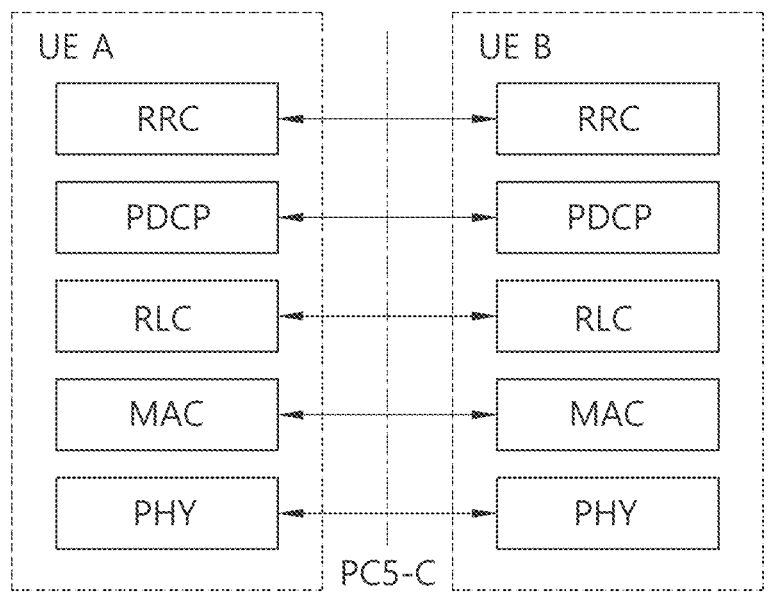
FIGS. 10 and 11 show an example of PC5 protocol stacks to which implementations of the present disclosure is applied.
Figure 11:
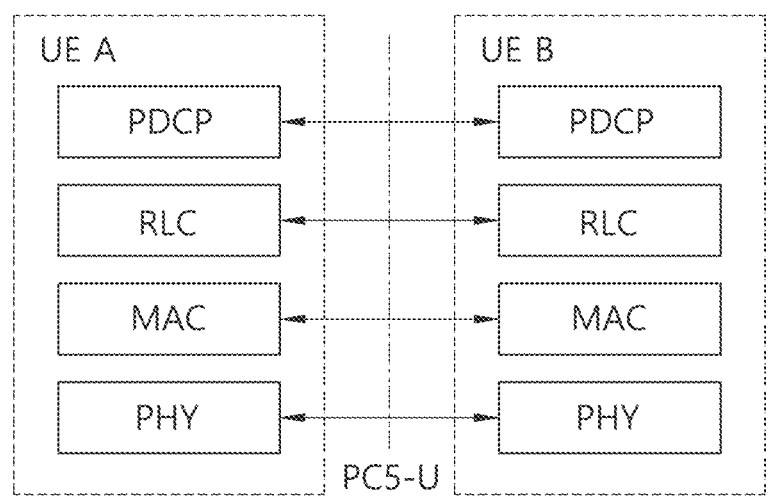

FIGS. 10 and 11 show an example of PC5 protocol stacks to which implementations of the present disclosure is applied.

FIG. 10 illustrates an example of a PC5 control plane (PC5-C) protocol stack between UEs. The AS protocol stack for the control plane in the PC5 interface consists of at least RRC, PDCP, RLC and MAC sublayers, and the physical layer.

FIG. 11 illustrates an example of a PC5 user plane (PC5-U) protocol stack between UEs. The AS protocol stack for user plane in the PC5 interface consists of at least PDCP, RLC and MAC sublayers, and the physical layer.

For the purposes of physical layer analysis, it is assumed that higher layers decide if unicast, groupcast, or broadcast transmission is to be used for a particular data transfer, and they correspondingly inform the physical layer. When considering a unicast or groupcast transmission, it is assumed that the UE is able to establish which unicast or groupcast session a transmission belongs to, and that the following identities is known to the physical layer:

The layer-1 destination ID, conveyed via physical sidelink control channel (PSCCH)
Additional layer-1 ID(s), conveyed via PSCCH, at least for the purpose of identifying which transmissions can be combined in reception when HARQ feedback is in use
HARQ process ID For the purpose of Layer 2 analysis, it is assumed that upper layers (i.e., above AS) provide the information on whether it is a unicast, groupcast or broadcast transmission for a particular data transfer. For the unicast and groupcast transmission in SL, the following identities is known to Layer 2:

Unicast: destination ID, source ID
Groupcast: destination group ID, source ID

Discovery procedure and related messages for the unicast and groupcast transmission are up to upper layers.

At least the following two SL resource allocation modes are defined as follows.
 (1) Mode 1: BS schedules SL resource(s) to be used by UE for SL transmission(s).
 (2) Mode 2: UE determines, i.e., BS does not schedule, SL transmission resource(s) within SL resources configured by BS/network or pre-configured SL resources.

The definition of SL resource allocation Mode 2 covers:
 a) UE autonomously selects SL resource for transmission
 b) UE assists SL resource selection for other UE(s)
 c) UE is configured with NR configured grant (Type-1 like) for SL transmission
 d) UE schedules SL transmissions of other UEs For SL resource allocation Mode 2, sensing and resource (re-)selection-related procedures may be considered. The sensing procedure considered is defined as decoding sidelink control information (SCI) from other UEs and/or SL measurements. The resource (re-)selection procedure considered uses the results of the sensing procedure to determine resource(s) for SL transmission.

For Mode 2(a), SL sensing and resource selection procedures may be considered in the context of a semi-persistent scheme where resource(s) are selected for multiple transmissions of different TBs and a dynamic scheme where resource(s) are selected for each TB transmission.

The following techniques may be considered to identify occupied SL resources:
 Decoding of SL control channel transmissions
 SL measurements
 Detection of SL transmissions The following aspects may be considered for SL resource selection:
 How a UE selects resource for PSCCH and physical sidelink shared channel (PSSCH) transmission (and other SL physical channel/signals that are defined)
 Which information is used by UE for resource selection procedure Mode 2(b) is a functionality that can be part of Mode 2(a), (c), (d) operation.

For out-of-coverage operation, Mode 2(c) assumes a (pre-)configuration of single or multiple SL transmission patterns, defined on each SL resource pool. For in-coverage operation, Mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A pattern is defined by the size and position(s) of the resource in time and frequency, and the number of resources.

For Mode 2(d), the procedures to become or serve as a scheduling UE for in-coverage and out-of-coverage scenarios may be considered as follows:
 Scheduling UE is configured by gNB
 Application layer or pre-configuration selects scheduling UE
 Receiver UE schedules transmissions of the transmitter UE during the session
 Scheduling UE is decided by multiple UEs including the one that is finally selected. The UE may autonomously decide to serve as a scheduling UE/offer scheduling UE functions (i.e., by self-nomination).

Sidelink HARQ operation is described. Section 5.14.1.2 of 3GPP TS 36.321 V15.4.0 (2018-12) can be referred.

The MAC entity is configured by upper layers to transmit using pool(s) of resources on one or multiple carriers. For each carrier, there is one sidelink HARQ entity at the MAC entity for transmission on sidelink shared channel (SL-SCH), which maintains a number of parallel sidelink processes.

For V2X sidelink communication, the maximum number of transmitting sidelink processes associated with each sidelink HARQ entity is 8. A sidelink process may be configured for transmissions of multiple MAC PDUs. For transmissions of multiple MAC PDUs, the maximum number of transmitting sidelink processes associated with each sidelink HARQ entity is 2.

A delivered and configured sidelink grant and its associated HARQ information are associated with a sidelink process.

For each subframe of the SL-SCH and each sidelink process, the sidelink HARQ entity shall:
 1> if a sidelink grant corresponding to a new transmission opportunity has been indicated for this sidelink process and there is SL data, for sidelink logical channels of proximity-based services (ProSe) destination associated with this sidelink grant, available for transmission:
  2> obtain the MAC PDU from the "Multiplexing and assembly" entity;
  2> deliver the MAC PDU and the sidelink grant and the HARQ information to this sidelink process;
  2> instruct this sidelink process to trigger a new transmission.
 1> else, if this subframe corresponds to retransmission opportunity for this sidelink process:
  2> instruct this Sidelink process to trigger a retransmission.

The sidelink process is associated with a HARQ buffer.

The sequence of redundancy versions is 0, 2, 3, 1. The variable CURRENT_IRV is an index into the sequence of redundancy versions. This variable is updated modulo 4.

New transmissions and retransmissions either for a given sidelink control (SC) period in sidelink communication or in V2X sidelink communication are performed on the resource indicated in the sidelink grant and with the MCS selected.

If the sidelink process is configured to perform transmissions of multiple MAC PDUs for V2X sidelink communication the process maintains a counter SL_RE-SOURCE_RESELECTION_COUNTER. For other configurations of the sidelink process, this counter is not available.

If the sidelink HARQ entity requests a new transmission, the sidelink process shall:
 1> set CURRENT_IRV to 0;
 1> store the MAC PDU in the associated HARQ buffer;
 1> store the sidelink grant received from the sidelink HARQ entity;
 1> generate a transmission as described below.

If the sidelink HARQ entity requests a retransmission, the sidelink process shall:
 1> generate a transmission as described below.

To generate a transmission, the sidelink process shall:
 1> if there is no uplink transmission; or if the MAC entity is able to perform uplink transmissions and transmissions on SL-SCH simultaneously at the time of the transmission; or if there is a MAC PDU to be transmitted in this TTI in uplink, except a MAC PDU obtained from the Msg3 buffer and transmission of V2X sidelink communication is prioritized over uplink transmission; and 1> if there is no sidelink discovery gap for transmission or no transmission on physical sidelink discovery channel (PSDCH) at the time of the transmission; or, in case of transmissions of V2X sidelink communication, if the MAC entity is able to perform transmissions on SL-SCH and transmissions on PSDCH simultaneously at the time of the transmission:

2> instruct the physical layer to generate a transmission according to the stored sidelink grant with the redundancy version corresponding to the CURRENT_IRV value.

1> increment CURRENT_IRV by 1;

1> if this transmission corresponds to the last transmission of the MAC PDU:

2> decrement SL_RESOURCE_RESELECTION_COUNTER by 1, if available.

The transmission of the MAC PDU for V2X sidelink communication is prioritized over uplink transmissions if the following conditions are met:

if the MAC entity is not able to perform all uplink transmissions and all transmissions of V2X sidelink communication simultaneously at the time of the transmission; and if uplink transmission is not prioritized by upper layer; and if the value of the highest priority of the sidelink logical channel(s) in the MAC PDU is lower than thresSL-TxPrioritization if thresSL-TxPrioritization is configured.

Multiplexing and assembly for SL-SCH data transmission is described. Section 5.14.1.3 of 3GPP TS 36.321 V15.4.0 (2018-12) can be referred.

For PDU(s) associated with one SCI, MAC shall consider only logical channels with the same source Layer-2 ID-destination layer-2 ID pair.

Multiple transmissions within overlapping SC periods to different ProSe Destinations are allowed subject to single-cluster SC-FDM constraint.

In V2X sidelink communication, multiple transmissions for different sidelink processes are allowed to be independently performed in different subframes.

The logical channel prioritization (LCP) procedure is applied when a new transmission is performed. Each sidelink logical channel has an associated priority which is the ProSe-per-packet priority (PPPP) and optionally an associated ProSe-per-packet reliability (PPPR). Multiple sidelink logical channels may have the same associated priority. The mapping between priority and logical channel ID (LCID) is left for UE implementation. If duplication is activated, the MAC entity shall map different sidelink logical channels which correspond to the same PDCP entity onto different carriers, or onto different carriers of different carrier sets (if configured in allowedCarrierFreqList for the corresponding destination). For a given sidelink logical channel, it is up to UE implementation which carrier set to select among the carrier sets configured in allowedCarrierFreqList for the corresponding destination.

The MAC entity shall perform the following logical channel prioritization procedure either for each SCI transmitted in an SC period in sidelink communication, or for each SCI corresponding to a new transmission in V2X sidelink communication:

1> The MAC entity shall allocate resources to the sidelink logical channels in the following steps:

2> Only consider sidelink logical channels not previously selected for this SC period and the SC periods (if any) which are overlapping with this SC period, to have data available for transmission in sidelink communication;

2> Only consider sidelink logical channels which meet the following conditions:

3> allowed on the carrier where the SCI is transmitted for V2X sidelink communication, if the carrier is configured by upper layers;

3> having a priority whose associated threshCBR-FreqReselection is no lower than the CBR of the carrier when the carrier is (re-)selected;

2> Only consider one sidelink logical channel among sidelink logical channels corresponding to same PDCP entity, if duplication is activated.

2> Step 0: Select a ProSe destination, having the sidelink logical channel with the highest priority, among the sidelink logical channels having data available for transmission and having the same transmission format as the one selected corresponding to the ProSe Destination;

1> For each MAC PDU associated to the SCI:

2> Step 1: Among the sidelink logical channels belonging to the selected ProSe destination and having data available for transmission, allocate resources to the sidelink logical channel with the highest priority;

2> Step 2: if any resources remain, sidelink logical channels belonging to the selected ProSe destination are served in decreasing order of priority until either the data for the sidelink logical channel(s) or the SL grant is exhausted, whichever comes first. Sidelink logical channels configured with equal priority should be served equally.

1> The UE shall also follow the rules below during the scheduling procedures above:

2> the UE should not segment an RLC SDU (or partially transmitted SDU) if the whole SDU (or partially transmitted SDU) fits into the remaining resources;

2> if the UE segments an RLC SDU from the sidelink logical channel, it shall maximize the size of the segment to fill the grant as much as possible;

2> the UE should maximise the transmission of data;

2> if the MAC entity is given a sidelink grant size that is equal to or larger than 10 bytes (for sidelink communication) or 11 bytes (for V2X sidelink communication) while having data available for transmission, the MAC entity shall not transmit only padding.

As described above, multiple packets from multiple logical channels for different services can be multiplexed into one single MAC PDU to be transmitted. Then, HARQ entity may perform transmission and/or retransmissions of the MAC PDU.

In LTE/LTE-A, the maximum number of retransmissions may be configured to a wireless device by the network. The configured maximum number of retransmissions may be applied to all HARQ retransmissions regardless of what is contained in the MAC PDU. Thus, the wireless device cannot retransmit a certain MAC PDU up to more than the maximum number of retransmissions required for a service carried in the MAC PDU.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 12:
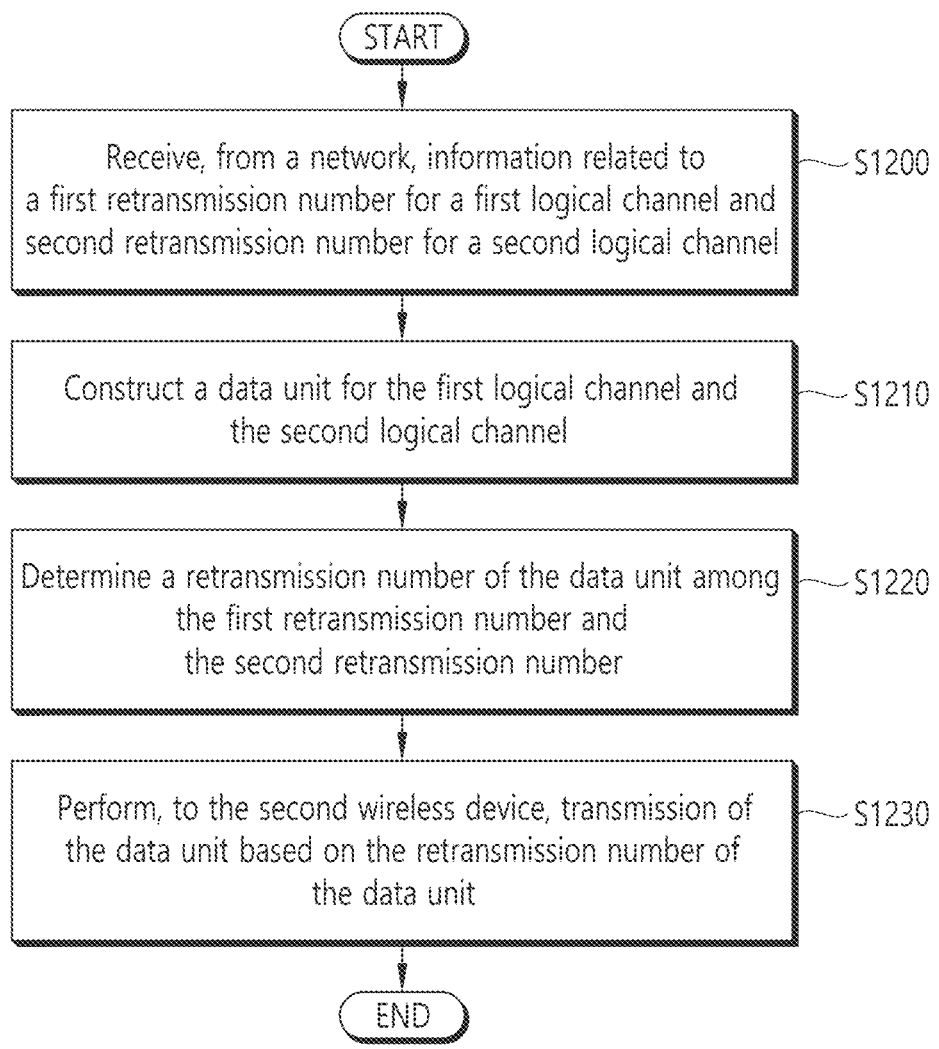
FIG. 12 shows an example of a method for a first wireless device according to implementations of the present disclosure.

FIG. 12 shows an example of a method for a first wireless device according to implementations of the present disclosure.

The first wireless device may be in communication with at least one of a mobile device, a network, and/or autonomous vehicles other than the first wireless device.

In step S1200, the first wireless device receives, from a network, information related to a first retransmission number for a first logical channel and a second retransmission number for a second logical channel.

In some implementations, the first retransmission number may include a first maximum number of retransmissions for the first logical channel. The second retransmission number may include a second maximum number of retransmissions for the second logical channel.

In some implementations, the first logical channel may belong to a first logical channel group. The second logical channel may belong to a second logical channel group. That is, the first retransmission number may be configured for the first logical channel group including the first logical channel, and the second retransmission number may be configured for the second logical channel group including the second logical channel.

In step S1210, the first wireless device, constructs a data unit for the first logical channel and the second logical channel.

In some implementations, the data unit may include a MAC PDU. The MAC PDU may include one or more MAC SDUs from the first logical channel and the second logical channel.

In some implementations, the data unit may be constructed based on a grant. The grant may include a sidelink grant. The sidelink grant may be autonomously created by the first wireless device. Or, the sidelink grant may be received from the network. The sidelink grant may be mapped to at least one of the first logical channel and/or the second logical channel.

In step S1220, the first wireless device determines a retransmission number of the data unit among the first retransmission number and the second retransmission number.

In some implementations, the retransmission number of the data unit may be a highest number among the first retransmission number and the second retransmission number.

In step S1230, the first wireless device performs, to the second wireless device, transmission of the data unit based on the retransmission number of the data unit.

In some implementations, the (re-)transmission of the data unit may be performed up to the retransmission number of the data unit based on not being positively acknowledged by the second wireless device. That is, when (re-)transmission of the MAC PDU is not positively acknowledged by the second wireless device, the first wireless device may perform (re-)transmission of the data unit up to the retransmission number of the data unit.

In some implementations, the (re-)transmission of the data unit may be performed up to the retransmission number of the data unit based on reception of a grant for a retransmission. That is, when a grant is received for a retransmission, the first wireless device may perform (re-)transmission of the data unit up to the retransmission number of the data unit.

In some implementations, additionally and/or alternatively, information related to a first timer value for the first logical channel and a second timer value for the second logical channel may be received from the network. A retransmission timer value may be determined among the first timer value and the second timer value. The retransmission timer value may be a highest timer value among the first timer value and the second timer value. In some implementations, a timer may start upon performing a new transmission of the data unit.

In some implementations, the (re-)transmission of the data unit may be performed until the timer runs up to the retransmission timer value based on not being positively acknowledged by the second wireless device. That is, when (re-)transmission of the MAC PDU is not positively acknowledged by the second wireless device, the first wireless device may perform (re-)transmission of the data unit until the timer runs up to the retransmission timer value.

In some implementations, the (re-)transmission of the data unit may be performed until the timer runs up to the retransmission timer value based on reception of a grant for a retransmission. That is, when a grant is received for a retransmission, the first wireless device may perform (re-)transmission of the data unit until the timer runs up to the retransmission timer value.

In some implementations, the first/second retransmission numbers for the first/second logical channels may be replaced by first/second retransmission numbers for e.g., first/second service types, first/second priorities, first/second QoS indicators and/or first/second destinations, respectively. For example, the first retransmission number may be configured for the first service type, and the second retransmission number may be configured for the second service type.

In some implementations, the first/second timer values for the first/second logical channels may be replaced by first/second timer values for e.g., first/second service types, first/second priorities, first/second QoS indicators and/or first/second destinations, respectively. For example, the first timer value may be configured for the first service type, and the second timer value may be configured for the second service type.

In some implementations, the priority may include at least one of a logical channel priority, PPPP and/or PPPR.

In some implementations, the QoS indicator may include at least one of a QoS class identifier (QCI) and/or 5G QoS indicator (5Q1).

Figure 13:
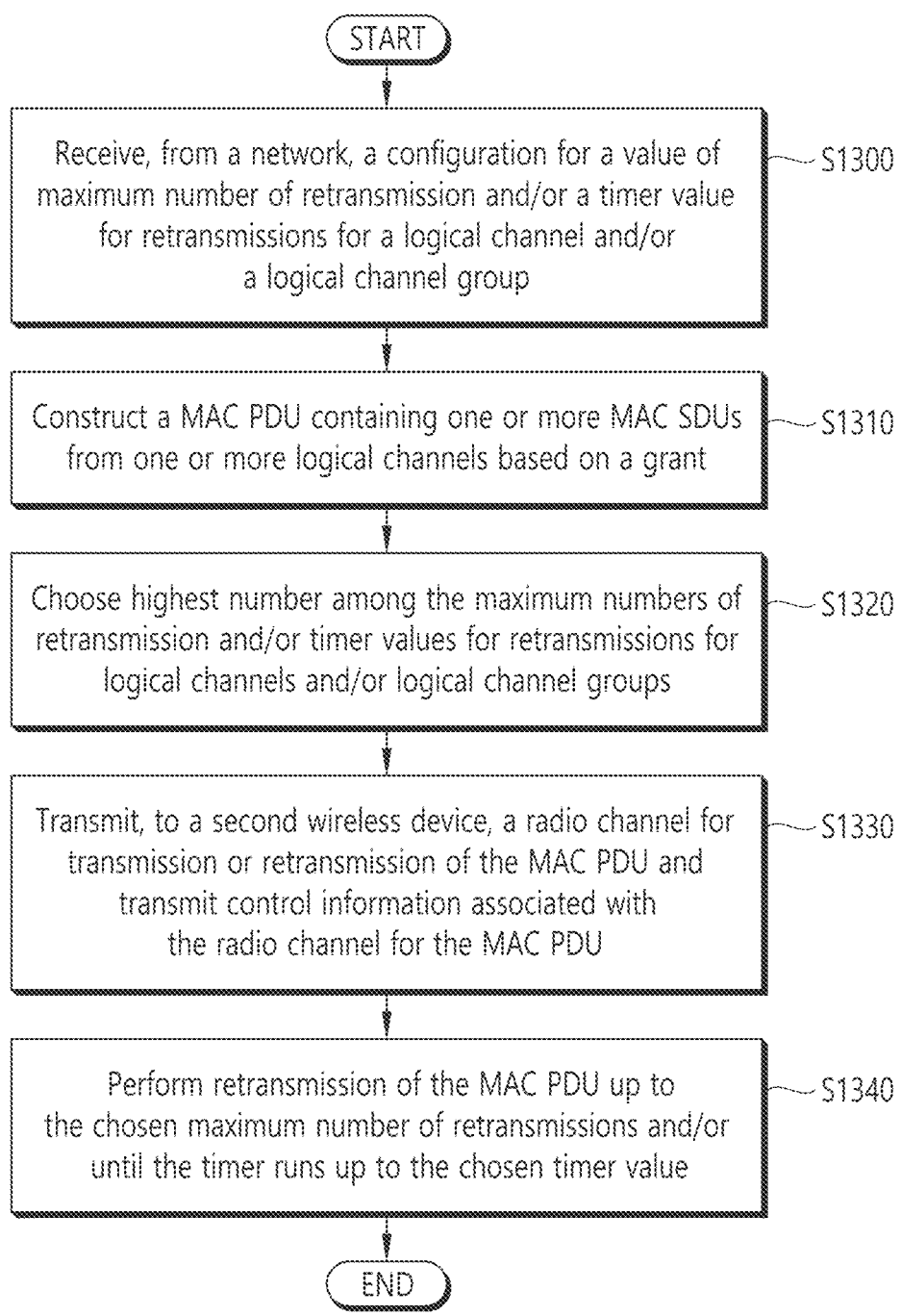
FIG. 13 shows an example of a method for performing data transmission by a first wireless device according to implementations of the present disclosure.

FIG. 13 shows an example of a method for performing data transmission by a first wireless device according to implementations of the present disclosure.

In step S1300, the first wireless device receives a configuration for a value of the maximum number of retransmissions and/or a timer value for retransmissions for a logical channel and/or logical channel group.

In some implementations, the network (e.g., base station, gNB, eNB, etc.) may configure the value of the maximum number of retransmissions and/or the timer value for retransmissions for each logical channel and/or each logical channel group to the first wireless device.

In some implementations, different logical channels may be configured with different values. For example, a first maximum number of retransmissions may be configured for a first logical channel and/or a first logical channel group, and a second maximum number of retransmissions may be configured for a second logical channel and/or a second logical channel group. For example, a first timer value for retransmissions may be configured for a first logical channel and/or a first logical channel group, and a second timer value for retransmissions may be configured for a second logical channel and/or a second logical channel group.

In step S1310, if a grant is available, the first wireless device constructs a MAC PDU containing one or more SDUs from one or more logical channels based on the grant.

In some implementations, the first wireless device may start a timer when the first wireless device performs new transmission of the MAC PDU.

In some implementations, the grant may be include a sidelink grant. The first wireless device may autonomously create the sidelink grant. Or, the first wireless device may receive the sidelink grant from the network.

In some implementations, if a cell, a carrier and/or a resource pool is associated with multiple logical channels, the logical channels may be mapped to the grant. If the first wireless device autonomously allocates a grant for retransmission, the first wireless device may choose the highest number among the maximum numbers of retransmissions and/or the configured timer values for those logical channels, and then select one or more grants based on the chosen maximum number of retransmissions and/or the configured timer values for those logical channels.

In step S1320, the first wireless device chooses the highest number among the maximum numbers of retransmissions and/or the configured timer values for the logical channels and/or logical channel groups.

In step S1330, the first wireless device transmits a radio channel for transmission and/or retransmission of the MAC PDU. The first wireless device may transmit control information associated with the radio channel for the MAC PDU. The control information may include information for the chosen maximum number of retransmissions and/or the chosen timer value for the MAC PDU.

In step S1340, if (re-)transmission of the MAC PDU is not positively acknowledged, and/or if a grant is received for a retransmission, the first wireless device performs a retransmission of the MAC PDU up to the chosen maximum number of retransmissions and/or until the timer runs up to the chosen timer value.

In some implementations, a value of the maximum number of retransmissions and/or a timer value for retransmissions for a logical channel and/or a logical channel group may be replaced by a value of the maximum number of retransmissions and/or a timer value for retransmissions for e.g., a service type, a priority, a QoS indicator and/or a destination. In this case, different service types, different priorities, different QoS indicators and/or different destinations can be configured with different values.

In some implementations, the priority may include at least one of a logical channel priority, PPPP and/or PPPR.

In some implementations, the QoS indicator may include at least one of QCI and/or 5QI.

Figure 14:
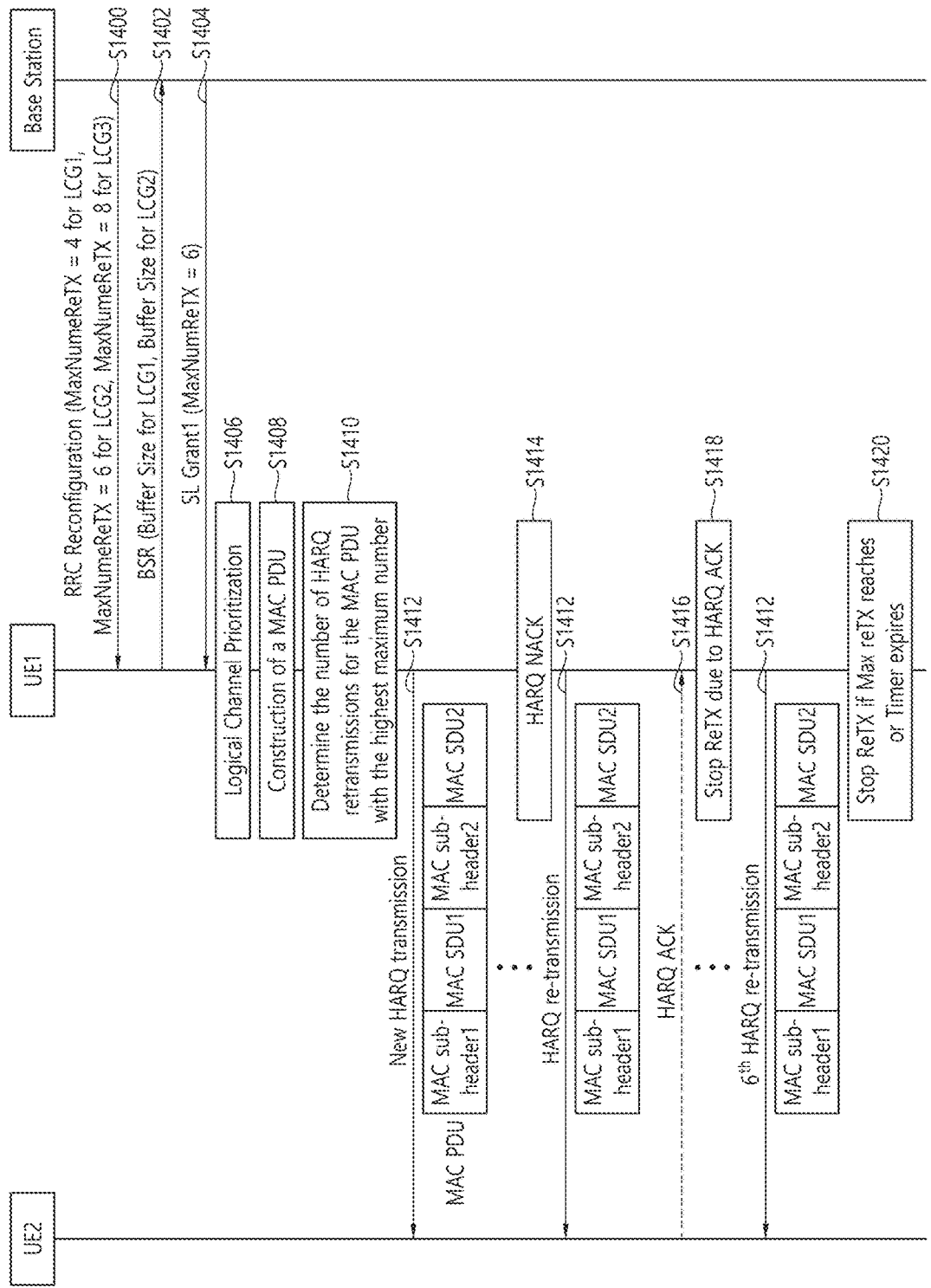
FIG. 14 shows an example of a sidelink data transmission according to implementations of the present disclosure.

FIG. 14 shows an example of a sidelink data transmission according to implementations of the present disclosure.

In some implementations, if UE1 is in RRC_CONNECTED and configured for BS scheduled sidelink resource allocation (i.e., Mode 1 described above), UE1 may transmit sidelink UE information to BS. The sidelink UE information may include at least one of traffic pattern of Service A, TX carriers and/or RX carriers mapped to Service A, QoS information related to Service A (e.g., 5QI, PPPP, PPPR, QCI value), service type of Service A (e.g., unicast transmission, groupcast transmission or broadcast transmission), and/or destination related to Service A and/or another UE (e.g., destination ID, destination Index and/or UE ID mapped to Service A and/or another UE).

In some implementations, after receiving the sidelink UE information, BS may construct sidelink configuration at least including one or more resource pools for Service A and/or unicast transmission with another UE and sidelink buffer status report (BSR) configuration such as mapping between a LCG and one or more QoS values or mapping between a LCG and the service type of Service A. BS may signal the sidelink configuration to UE1. Then, UE1 may configure lower layers with sidelink configuration.

Alternatively, if UE1 is configured for UE autonomous scheduling of sidelink resource allocation (i.e., Mode 2 described above), UE1 may autonomously select and/or reselect sidelink resources to create a sidelink grant used for transmission to another UE, e.g., UE2.

In step S1400, BS configures the maximum number of HARQ retransmissions and/or the timer value for retransmissions for each logical channel and/or each logical channel group for UE1. Different logical channels and/or different logical channel groups can be configured with different maximum numbers of HARQ retransmissions and/or different timer values for retransmissions. BS transmits the configuration to UE1. Upon receiving the configuration, UE1 applies the configuration to HARQ operation.

In this example, it is assumed that the maximum number of HARQ retransmission for a logical channel group 1 is 4, the maximum number of HARQ retransmission for a logical channel group 2 is 6, and the maximum number of HARQ retransmission for a logical channel group 3 is 8.

In some implementations, the maximum number of HARQ retransmissions and/or the timer value for retransmissions can be configured for e.g., a service type, a priority, a QoS indicator and/or a destination. In this case, different service types, different priorities, different QoS indicators and/or different destinations can be configured with different values. The priority may be include at least one of a logical channel priority, PPPP and/or PPPR. The QoS indicator may include at least one of QCI and/or 5Q1. For example, the maximum number of HARQ retransmissions and/or the timer value for retransmissions can be configured for a logical channel priority or a 5Q1.

In some implementations, another UE may configure the maximum number of HARQ retransmissions and/or the timer value for retransmissions for each service type, each priority (e.g., each PPPP and/or each PPPR), each QoS indicator and/or each destination.

In step S1402, UE1 may trigger a scheduling request (SR) to acquire sidelink grant. If the sidelink grant is received, UE1 may transmit sidelink buffer status report MAC control element (SL BSR MAC CE) based on the sidelink grant to indicate buffer size for one or more logical channels and/or one or more logical channel groups.

In some implementations, UE1 may choose the highest number among the maximum numbers of retransmissions and/or the configured timer values for the logical channels and/or the logical channel groups that are indicated by the SL BSR MAC CE and/or have data available in L2 buffer (e.g., RLC/PDCP buffer of RLC entities that can use the same resource on the same cell on the same bandwidth part on the same carrier).

In some implementations, UE1 may additionally indicate at least one of the chosen maximum number of sidelink grants for retransmissions, how many HARQ retransmissions UE1 wants to perform, and/or how long HARQ retransmissions UE1 wants to perform for each logical channel and/or each logical channel group, to BS via the SL BSR MAC CE or uplink control information (UCI).

In some implementations, UE1 may additionally indicate at least one of the chosen maximum number of sidelink grants for retransmissions, how many HARQ retransmissions UE1 wants to perform, and/or how long HARQ retransmissions UE1 wants to perform for each logical channel and/or each logical channel group, to another UE, e.g., UE2, via a MAC CE or sidelink control information.

In some implementations, the SL BSR MAC CE may further indicate at least one of a destination index or UE Index, a LCG, and/or a buffer size corresponding to the destination service, the destination group and/or the destination UE (e.g., another UE). The destination index may address the destination service, the destination group and/or the destination UE. The UE index may address the destination/receiving UE, e.g., another UE.

In this example, it is assumed that the SL BSR MAC CE includes a buffer size for the logical channel group 1 and a buffer size for the logical channel group 2.

In step S1404, upon receiving the SL BSR MAC CE from UE1, BS can determine the number of sidelink grants for retransmissions for a new HARQ transmission, how many HARQ retransmissions UE1 may perform and/or how long HARQ retransmissions UE may perform. BS creates a sidelink grant for the new HARQ transmission. BS may create zero, or more sidelink grants for retransmissions based on at least one of the number of HARQ retransmissions, how many HARQ retransmissions UE1 may perform, and/or how long HARQ retransmissions UE1 may perform. Then, BS transmits PDCCH to UE1.

In some implementations, the PDCCH may indicate the sidelink grant for new transmission and zero or more sidelink grants for retransmissions. In this case, UE1 may use the sidelink grant for new transmission of a MAC PDU and the other sidelink grants for retransmissions of the MAC PDU.

In some implementations, the PDCCH may indicate a sidelink grant and the number of HARQ retransmissions with a certain pattern (e.g., periodic and/or aperiodic allocation of the sidelink grant with a regular and/or irregular interval). In this case, UE1 may repeatedly use the sidelink grant and/or the resource indicated by the sidelink grant for new transmission and retransmissions of a MAC PDU based on the indicated pattern and the number of HARQ retransmissions.

In some implementations, the PDCCH may further indicate the destination index and/or UE index. The index may be used to indicate the service or another UE explicitly or implicitly.

In some implementations, UE1 may autonomously create the sidelink grant(s) or receive the sidelink grant(s) from BS for new transmission and retransmissions. If UE1 autonomously create the sidelink grant(s), the number of HARQ retransmissions and/or the timer value for retransmissions may be associated with the sidelink grant(s) because the number of HARQ retransmissions may be determined by the sidelink grant(s).

In this example, it is assumed that BS determines the maximum number HARQ retransmission as 6, since UE1 reports the SL BSR MAC CE including a buffer size for the logical channel group 1 (i.e., corresponding maximum number of retransmission is 4) and a buffer size for the logical channel group 2 (corresponding maximum number of retransmission is 6) in step S1402.

In step S1406, if UE1 receives the sidelink grant from BS, UE1 performs logical channel prioritization. In step S1408, based on the logical channel prioritization, UE1 constructs a MAC PDU based on the sidelink grant. In step S1410, UE1 determines the number of HARQ retransmissions for the MAC PDU with the highest maximum number of HARQ retransmission for each logical channel and/or each logical channel group.

In some implementations, UE1 may include one or more MAC SDUs from one or more logical channels into the MAC PDU based on the sidelink grant and/or the number of HARQ retransmissions related to the sidelink grant. For example, if the number of HARQ retransmissions and/or the timer value for retransmissions is indicated or associated with the sidelink grant, UE1 may include one or more MAC SDUs only from the logical channel of which the configured number of HARQ retransmissions and/or the configured timer value is equal to or lower than the number of HARQ retransmissions supported by the sidelink grants.

For example, if UE1 allocates or receives sidelink grants for 6 retransmissions, UE1 may only consider logical channels of which the number of HARQ retransmissions is configured with 4 or 6 to perform logical channel prioritization. In this example, UE1 only considers logical channel group 1 and logical channel group 2 to create a MAC PDU to be transmitted and retransmitted based on the sidelink grant.

In some implementations, UE1 may deliver the MAC PDU to a sidelink HARQ process with the sidelink grant for new transmission and/or the sidelink grants for retransmissions. The sidelink HARQ process may be associated with the number of HARQ retransmissions and/or the timer value for retransmissions. UE1 may flush HARQ buffer of the sidelink HARQ process after completing the number of retransmissions and/or the timer expires. In case of the timer, UE1 may start the timer when UE1 submits the MAC PDU to the physical layer or transmits the MAC PDU.

In step S1412, UE1 performs HARQ transmission and/or HARQ retransmissions. If a HARQ transmission and/or a retransmission is not positively acknowledged by UE2 in step S1414, UE1 may perform a HARQ retransmission of the MAC PDU from the sidelink HARQ process, if a sidelink grant is available for this retransmission.

In some implementations, UE1 may consider HARQ retransmissions of the MAC PDU is completed and flushes the HARQ buffer, if one of the following conditions is met:
  when the number of maximum retransmissions of the MAC PDU was reached regardless of positive acknowledgement
  when a timer associated with the MAC PDU expires regardless of positive acknowledgement
  when a positive acknowledgement is received For example, in step S1416, the positive acknowledgement is received from UE2. In this case, in step S1418, UE1 consider HARQ retransmissions of the MAC PDU is completed, and stops HARQ retransmission.

For example, in step S1412, a number of HARQ retransmission has reached the determined maximum number of HARQ retransmission, e.g., 6. In this case, in step S1420, UE1 consider HARQ retransmissions of the MAC PDU is completed, and stops HARQ retransmission.

In some implementations, if the sidelink grant for retransmission is not used due to completion of HARQ transmissions of the MAC PDU, UE1 may skip the sidelink grant allocated for retransmission (e.g., when the HARQ buffer is empty). Alternatively, if another MAC PDU is delivered to the sidelink HARQ process, UE1 may use the sidelink grant allocated retransmission for new transmission of another MAC PDU.

The present disclosure can have various advantageous effects.

A wireless device performing sidelink HARQ transmission of a packet by using radio resources can dynamically and efficiently allocate resources for retransmissions of the packet by considering service characteristics and/or requirements, in particular when packets from various services are multiplexed into a single data unit.

The system can provide dynamic and efficient allocation of resources for data retransmissions for a wireless device performing sidelink HARQ transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a base station adapted to operate in a wireless communication system, the method comprising:
    configuring a maximum number of transmissions for a sidelink grant,
    wherein the maximum number of transmissions is related to a logical channel priority;
    configuring the sidelink grant; and
    transmitting a configuration for the maximum number of transmissions and the sidelink grant to a user equipment,
    wherein a retransmission number for a media access control (MAC) protocol data unit (PDU) is determined based on the maximum number of transmissions, and
    wherein the MAC PDU is transmitted based on the sidelink grant up to the retransmission number for the MAC PDU.

2. The method of claim 1, wherein the retransmission number for the MAC PDU is a highest number from among the maximum number of transmissions.

3. The method of claim 1, wherein the MAC PDU is transmitted up to the retransmission number for the MAC PDU based on not being positively acknowledged.

4. The method of claim 1, wherein the MAC PDU is constructed based on the sidelink grant.

5. A base station adapted to operate in a wireless communication system, the base station comprising:
    at least one transceiver;
    at least one processor; and
    at least one computer memory operably connectable to the at least one processor and storing instructions that, based on being executed by the at least one processor, perform operations comprising:
    configuring a maximum number of transmissions for a sidelink grant,
    wherein the maximum number of transmissions is related to a logical channel priority;
    configuring the sidelink grant; and
    transmitting, via the at least one transceiver, a configuration for the maximum number of transmissions and the sidelink grant to a user equipment,
    wherein a retransmission number for a media access control (MAC) protocol data unit (PDU) is determined based on the maximum number of transmissions, and
    wherein the MAC PDU is transmitted based on the sidelink grant up to the retransmission number for the MAC PDU.

6. The base station of claim 5, wherein the retransmission number for the MAC PDU is a highest number from among the maximum number of transmissions.

7. The base station of claim 5, wherein the MAC PDU is transmitted up to the retransmission number for the MAC PDU based on not being positively acknowledged.

8. The base station of claim 5, wherein the MAC PDU is constructed based on the sidelink grant.

* * * * *